June 9, 1936.  S. J. NORDSTROM  2,043,863
PLUG VALVE
Filed Nov. 28, 1931  4 Sheets-Sheet 1
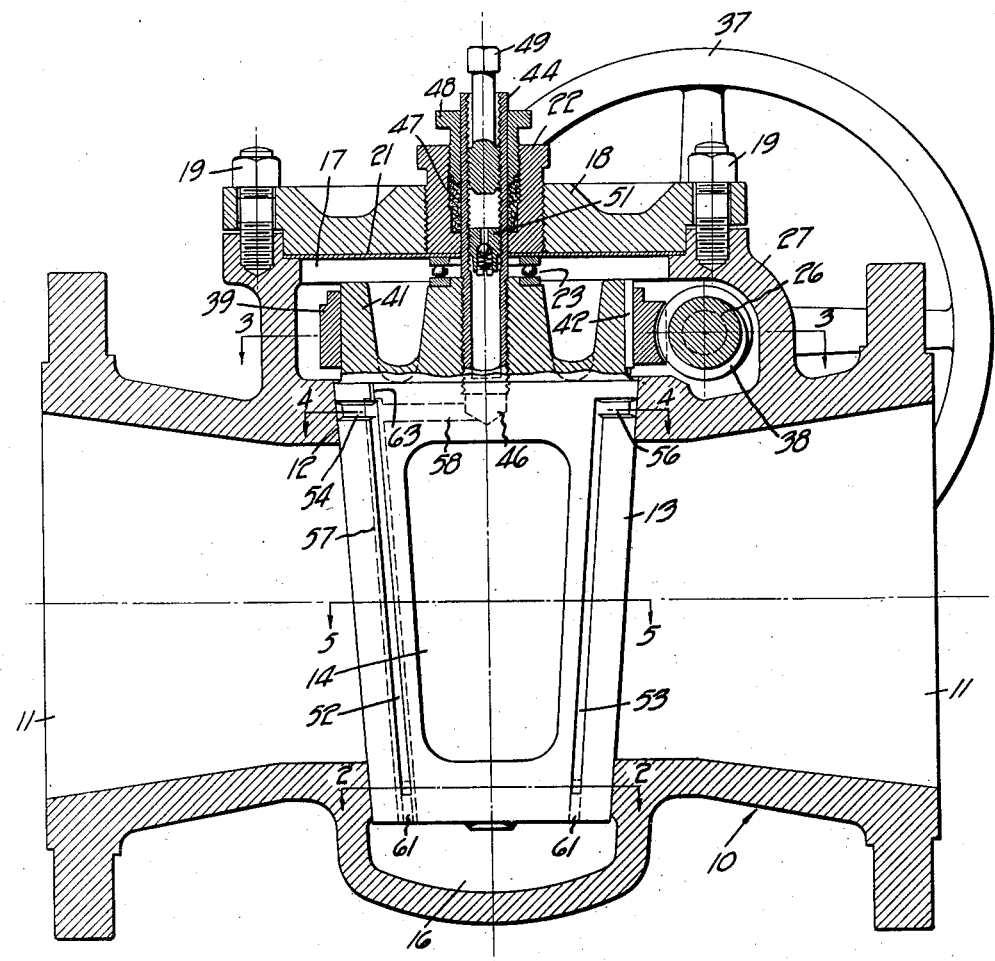
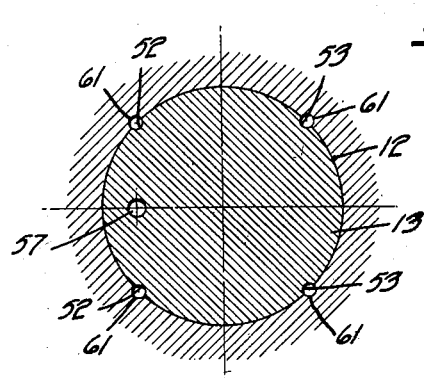
INVENTOR.
SVEN JOHAN NORDSTROM
BY
ATTORNEYS.

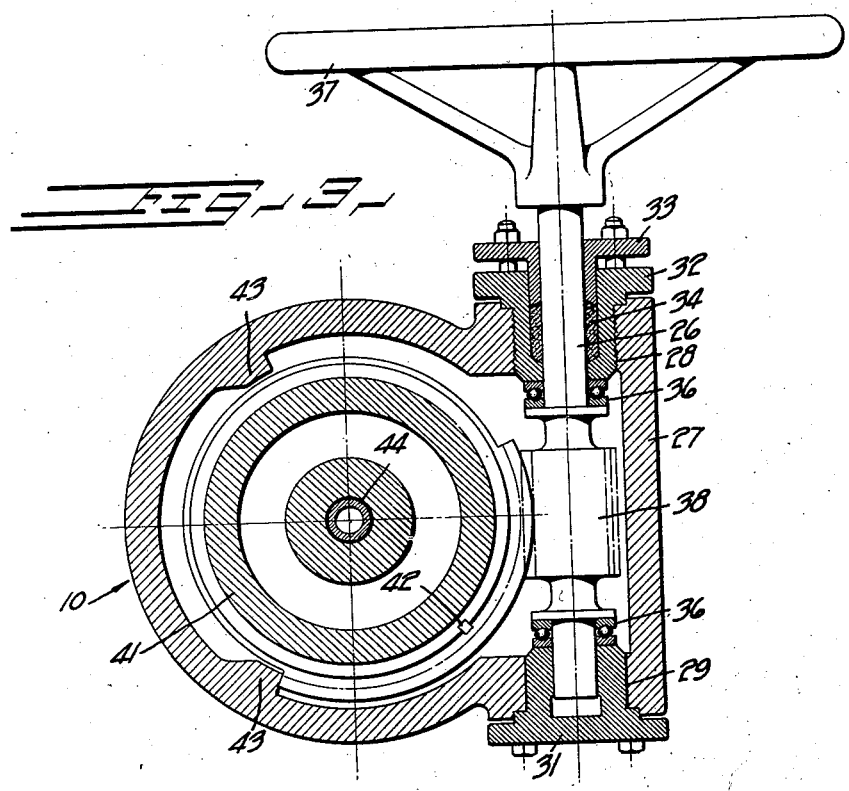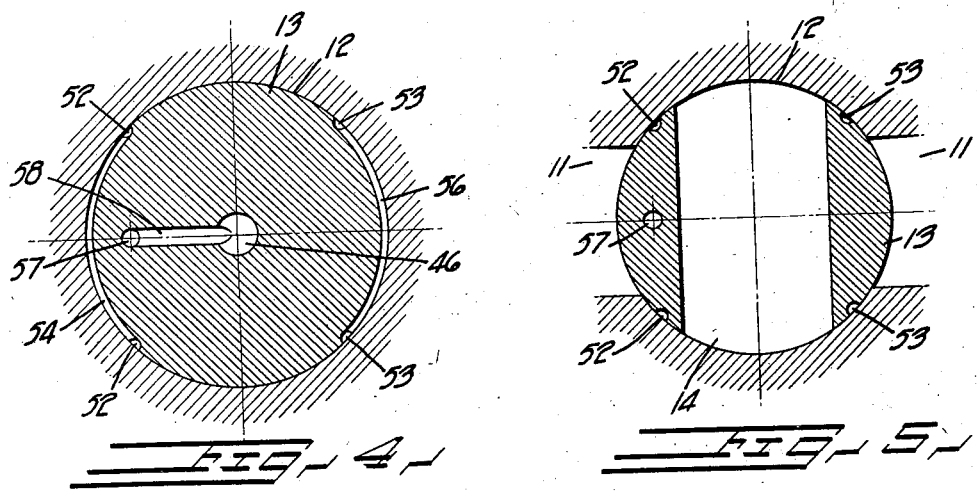

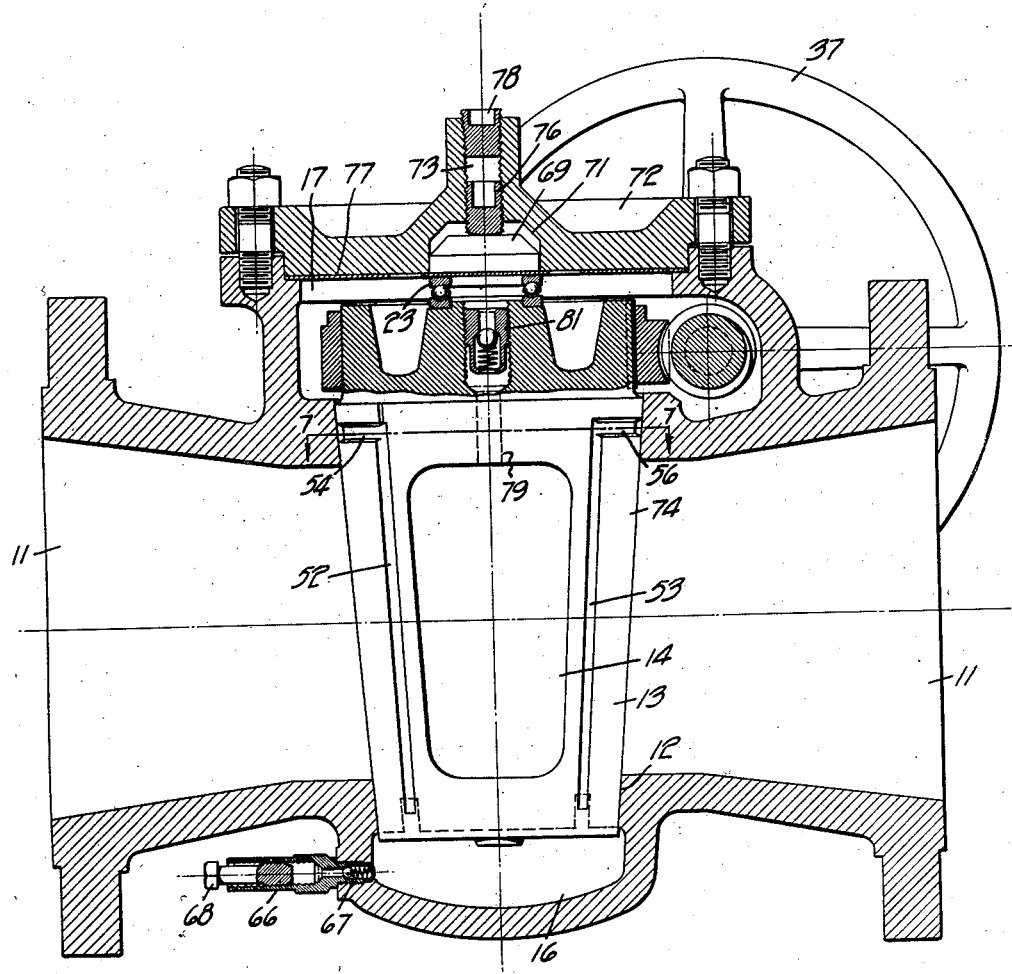
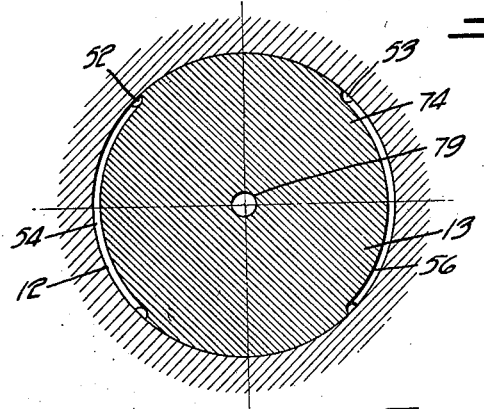

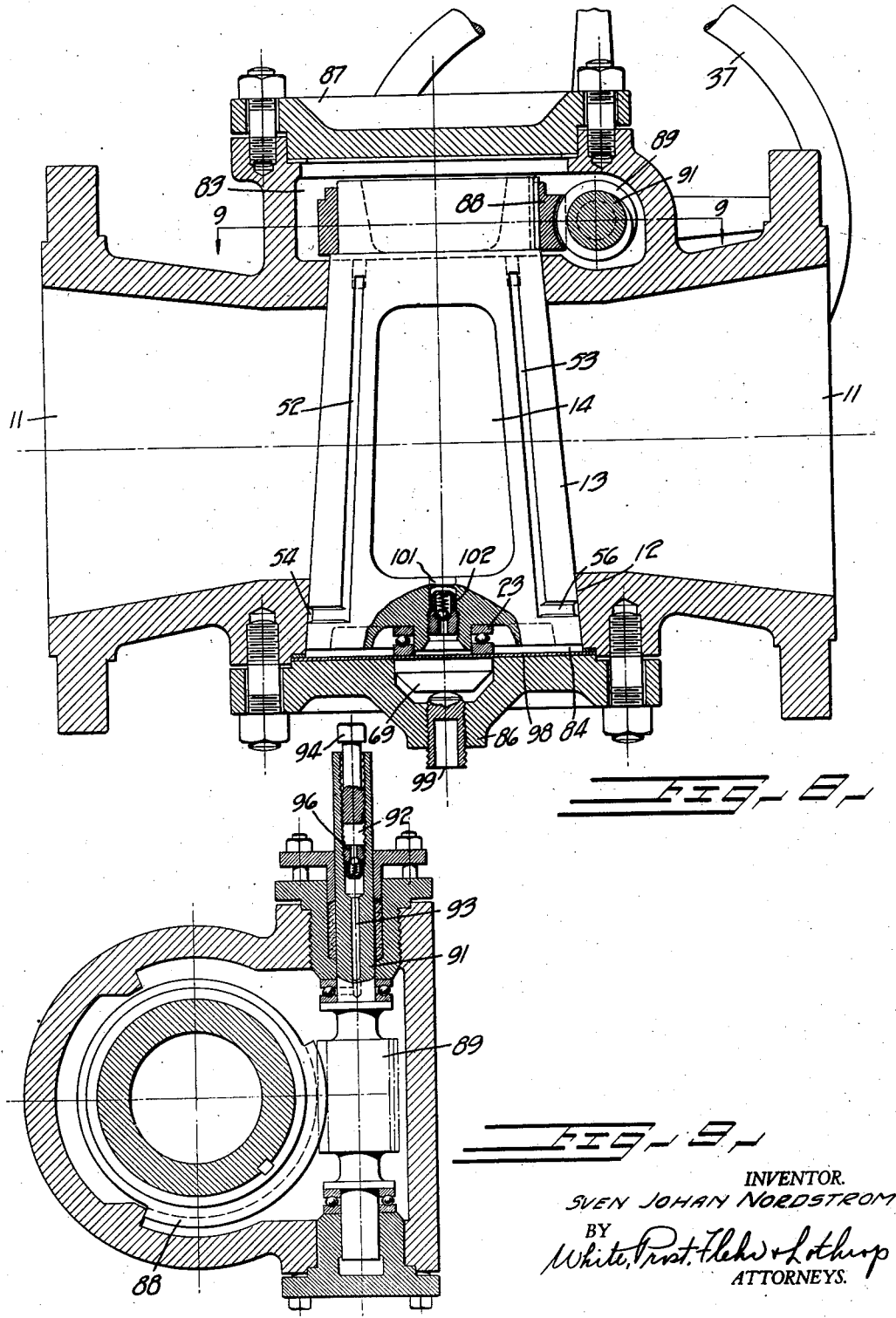

Patented June 9, 1936

2,043,863

UNITED STATES PATENT OFFICE 2,043,863

PLUG VALVE

Sven Johan Nordstrom, Piedmont, Calif., assignor to Merco Nordstrom Valve Company, San Francisco, Calif., a corporation of Delaware Application November 28, 1931, Serial No. 577,731

11 Claims. (Cl. 251—93)

This invention relates generally to valves of the rotary plug type, particularly valves of this character provided with pressure lubrication.

It is an object of this invention to devise a valve of the above character which can be operated with a minimum of manual effort, even when of relatively large size.

It is a further object of the invention to devise a lubricated plug valve capable of withstanding relatively high line pressures without leakage.

It is a further object of the invention to generally improve upon the lubricating features of plug valves, whereby parts in addition to the valve working surfaces, as for example thrust bearings and driving gearing, can be lubricated.

It is a further object of the invention to devise an improved mechanical construction for lubricated plug valves, which will enable manufacture of such valves in the larger sizes and for relatively high line pressures, at a minimum of cost.

Further objects of the invention will appear from the following description in which the preferred embodiments of the invention have been set forth in detail in conjunction with the accompanying drawings. It is understood that the appended claims are to be accorded a range of equivalents consistent with the state of the prior art.

Referring to the drawings:

Fig. 1 is a side elevational view, in cross section, illustrating a valve incorporating the present invention.

Fig. 2 is a cross sectional detail taken along the line 2—2 of Fig. 1.

Fig. 3 is a cross sectional detail taken along the line 3—3 of Fig. 1.

Fig. 4 is a cross sectional detail taken along the line 4—4 of Fig. 1.

Fig. 5 is a cross sectional detail taken along the line 5—5 of Fig. 1.

Fig. 6 is a side elevational view, in cross section, illustrating a modification of my invention.

Fig. 7 is a cross sectional detail taken along the line 7—7 of Fig. 6.

Fig. 8 is a side elevational view, in cross section, similar to Fig. 1, but illustrating a further modification of the invention.

Fig. 9 is a cross sectional detail taken along the line 9—9 of Fig. 8.

Referring first to the modification illustrated in Figs. 1 to 5 inclusive, the invention can be described in detail as comprising a body or casing 10, provided with a passageway 11 for flow of line fluid. Also formed within the casing and extending transversely of the passageway 11, there is a bore 12 in the form of a tapered or conical seat. Disposed within seat 12 there is a conical plug 13, provided with a hole 14 adapted to register with passageway 11 for open position of the valve.

The casing is also formed to provide chambers 16 and 17 at the large and small ends of the plug respectively. Chamber 16 is defined in part by cover plate 18, having its periphery secured to the remainder of the casing by suitable means such as cap screws 19. In the preferred form of my invention cover plate 18 is preferably resilient and is of sufficient inherent strength to withstand the line pressures to which the plug is adapted for operation. To secure a proper degree of resiliency and at the same time have sufficient inherent strength, cover plate 18 can be conveniently formed as a steel forging or steel casting. Its shaping is preferably symmetrical, as for example circular in contour. For sealing cover plate 18 with respect to the remainder of the casing, there is shown a diaphragm 21, which can be conveniently made of relatively thin flexible sheet metal, and this diaphragm has its peripheral edge portion clamped between cover plate 18 and the remainder of the casing.

To provide adequate means for holding the plug into its cooperating seat 12, there is shown a sleeve 22 threaded into the central part of cover plate 18. The inner annular end surface of sleeve 22 is adapted to bear upon and engage the inner peripheral surface of diaphragm 21. A suitable thrust bearing 23, which will afford a minimum of friction, as for example a roller bearing, is interposed between the central portion of the large end of the plug 13 and the lower surface of diaphragm 21. By adjusting sleeve 22, varying degrees of force can be applied to the large end of the plug to hold the plug into its seat.

To provide means for effecting rotation of the plug between open and closed position, I provide an operating shaft 26 which extends at right angles to the longitudinal axis of the plug 13. The main part of the valve casing is provided with a portion 27 to accommodate shaft 26, and this portion 27 is provided with aligned bores 28 and 29 concentric with respect to the shaft. A journal member 31, fitted into bore 29, serves as a bearing for the inner end of the shaft 26 and also as a closure for bore 29. A gland 32 is fitted into bore 28, and is provided with a follower 33 for compressing the packing 34. Suitable thrust bearings 36, as for example of the roller type, accommodate thrusts which may be applied longitudinally of shaft 26. The outer end of shaft 26 is adapted to be rotated by suitable means, as for example a hand wheel 37.

Interconnecting the inner portion of shaft 26 and the plug 13, there is suitable reduction gearing which in this instance is formed by a worm 38 fixed to shaft 26, and a segmental worm gear 39 having a driving connection with the large end of plug 13. It is convenient to form gear 39 in the form of a ring, which can be slipped over an annular flange 41 formed on the large end of plug 13. Suitable means, such as a key 42, prevents relative rotation between the worm gear ring and the plug. Spaced lugs 43 are adapted to engage the ends of the toothed portion of gear 39, to limit rotation of the plug through 90°.

In the particular form of pressure lubricating system illustrated for Figs. 1 to 5 inclusive, the lubricant is introduced into the valve through the bushing 22. Thus, referring to Fig. 1, extending through sleeve 22 and aligned with a longitudinal axis of plug 13, there is a tube 44. The large end of plug 13 is provided with an axial bore 46 with which the inner end of tube 44 has a threaded engagement. Leakage past tube 44 is prevented by a suitable packing 47, compressed by follower 48. Threaded into tube 44 from its outer end there is a pressure screw 49, and positioned within the tube there is a suitable check valve 51 which permits the introduction of lubricant, but prevents its back flow.

It is desirable to have the lubricant perform at least two functions, one being to supply lubricant to the valve working surfaces, and the other being to effect longitudinal jacking of the plug from its seat, in the event the plug becomes stuck or fast with respect to the casing. Thus formed in the periphery of plug 13, there are shown longitudinal channels 52 and 53. There are four longitudinal channels in all, as illustrated in Fig. 5, and the spacing can be substantially 90° as illustrated. The upper and lower ends of these longitudinal grooves are illustrated as terminating short of the upper and lower edges of the valve working surfaces. By valve working surfaces is meant the surfaces in contact between the periphery of the plug and the valve casing, which act to effect a seal between the plug and the casing. An arcuate transverse channel 54 connects the upper ends of longitudinal grooves 52 and a similar arcuate channel 56 connects the upper end of longitudinal grooves 53.

In the particular embodiment being described, lubricant is introduced into the lubricant grooves or channels by way of the chamber 16 at the small end of the plug. This chamber therefore in effect forms a part of the lubricating system. For introducing lubricant under pressure in the chamber 16, a lubricant duct 57 is formed within plug 13, (Figs. 1 and 5), and the lower end of this duct communicates with chamber 16. The other end of duct 57 communicates with a radial duct 58, which in turn communicates with bore 46. For establishing communication between lubricant chamber 16 and the longitudinal channels 52 and 53, for certain positions of the plug, four branch channels 61, communicating with chamber 16, are formed in the valve casing (Fig. 2). Branch channels 61 are in communication with the longitudinal channels 52 and 53 for both open and closed positions of the plug. However, for intermediate positions of the plug, such communication is disrupted, and therefore longitudinal channels which are then exposed to the line are disconnected from lubricant chamber 16, to prevent undue extrusion of lubricant.

The lubricant employed in the operation of the valve is of highly viscous form, such as is commonly utilized in the operation of lubricated plug valves, and which is available on the market in stick form. In lubricating the valve just described, such a lubricant is introduced by way of tube 44, and is compressed by turning down screw 49. Assuming that bore 46, ducts 57 and 58, and chamber 16 are filled with lubricant, further turning down of screw 49 causes lubricant to distribute itself through the longitudinal channels 52 and 53 and transverse channels 54 and 56. If a sufficiently high lubricant pressure is attained in chamber 16, the plug will be hydraulically jacked from its seat, the longitudinal movement being accommodated by the resilient character of cover plate 18. At the time of jacking lubricant is extruded between the valve working surfaces from the lubricant channels. In closed position of the plug, it will be noted that these channels form substantially closed circuits surrounding the passageway 11, these circuits at the small end of the plug being completed by chamber 16. For certain purposes it may be preferred to omit chamber 16 or replace this chamber by a circumferential groove, in which case it will be understood that the vertical component of lubricant pressure exerted in the grooves in the valve working surface may be sufficient to jack the plug off of its seat as disclosed in United States Patent Number 1,469,762 issued to me.

In addition to the lubrication thus far described, it is also preferable to provide for lubrication of worm 38 and worm gear 39, as well as for the thrust bearing 23 and thrust bearings 36. While chamber 17 can be packed with lubricant upon assembly of the valve to provide for such lubrication, it is preferable to provide for replenishing lubricant in this chamber from the main lubricating system for the valve. Thus, referring to Fig. 1, there is shown a relatively small groove or channel 63 connecting chamber 17 with a part of the general lubricating system. Channel 63 in this instance is formed on the periphery of plug 13, and connects between chamber 17 and the lateral channel 54.

Since the fluid pressure area presented by the large end of the plug is substantially greater than the fluid pressure area exposed to the lubricant in chamber 16, it is evident that if pressure were attained in chamber 17, substantially equal to the pressure attained in chamber 16 during jacking operations, proper jacking might be prevented. It is partly for this reason that channel 63 is made of relatively small dimensions, so as to serve in effect as means for greatly attenuating the pressure of lubricant supplied to chamber 17. By providing for such attenuation, proper jacking is not interfered with, and at the same time sufficient lubricant is permitted to flow into chamber 17 from time to time, to provide for adequate lubrication of worm 38 and gear 39 and also for thrust bearings 23 and bearings 36, and to protect these parts against corrosive line fluids. The presence of lubricant in chamber 16 also serves to seal the engagement between the lower end surface of sleeve 22, and diaphragm 21, thus preventing any leakage which might otherwise occur between sleeve 22 and cover plate 18.

The valve described above can be made in relatively large sizes for use in high pressure lines, and can be manipulated by a minimum of turning effort upon hand wheel 37. Since both ends of the plug terminate substantially entirely within the casing, and particularly since line pressure which is inevitably exerted within chambers 16 and 17 as well as in other parts of the valve, does not create forces tending to jam the plug into its seat, the plug can be turned at all times with a minimum of torque. Turning force is also minimized by the use of a thrust bearing 23, as described, in place of packings or other such means which have been utilized in the past for holding plugs into their seat. Lubrication of worm 38 and gear 39, as well as of thrust bearing 23 and bearings 36, also contributes to minimize frictional losses, and in addition minimizes wear and protects these parts from corrosive line fluid. The positioning of the reducing gearing within the casing simplifies the problem of preventing leakage of line fluid, as it is a far simpler matter to pack around the relatively small operating shaft 26, than to attempt to pack about a relatively large diameter plug stem. Likewise, packing about the relatively small diameter operating shaft 23 affords a minimum friction to turning. It will also be noted that the packing about operating shaft 26 is effectively isolated from jacking movements of the plug, since the jacking movements are accommodated by the reducing gearing. It has been found a difficult matter to provide a tight packing about the stem of a hydraulically jacked valve, as for example a valve such as shown in Nordstrom Patent No. 1,575,125, where the valve is utilized under relatively high pressure conditions. All difficulties of this character are obviated by my invention.

Another advantageous feature of my invention is that operating shaft 26 is journaled within the main portion of the valve casing, rather than within the cover plate 18. Such construction facilitates manufacture, simplifies the design, and makes it possible to form cover plate 18 as a steel forging or casting in symmetrical form, and with proper resilience and strength.

The modification illustrated in Figs. 6 and 7 embodies many of the features of the valve previously described with reference to Figs. 1 to 5 inclusive, except with respect to certain changes and additions. In this case the lubricant is not introduced into the large end of the plug, but is introduced directly into the chamber 16 at the small end of the plug by means of a suitable lubricant fitting 66. This fitting is shown provided with a check valve 67, and a lubricant pressure screw 68. For applying force to the thrust bearing 23, to hold the plug into its seat, there is shown a thrust block 69 fitted within a recess 71 formed in the inner face of cover plate 72. This plate 72 corresponds to the cover plate 18 of Fig. 1. Cover plate 72 is also provided with a bore 73 aligned with the axis of plug 74 (corresponding to plug 13 of Fig. 1), and fitted into this bore there is an adjusting screw 76. Diaphragm 77 (corresponding to diaphragm 21 of Fig. 1) may be perforated and has its inner portion interposed between thrust block 69 and thrust bearing 23. The outer end of threaded bore 73 can be sealed by suitable means, such as a pipe plug 78. Screw 76 can be adjusted to apply a proper force to thrust bearing 23 to hold the plug into its seat. If desired, the space between screw 76 and pipe plug 78 can be filled with a suitable sealing material, as for example a viscous sealing compound, to more adequately seal the threads of plug 78.

In the operation of the valve illustrated in Fig. 1, under certain conditions a relatively high fluid pressure may become trapped in the chamber 17 at the large end of the plug. Trapping of such a high fluid pressure in this chamber, after the line pressure in the remainder of the valve has been released, tends to hold the plug into its seat and makes turning temporarily difficult. In the modification illustrated in Fig. 6, there is provision for alleviating this difficulty. Thus, formed in the larger end portion of plug 74 there is a port 79, one end of which communicates with chamber 17, and the other end of which communicates with the hole 14 in plug 74. Flow of fluid through this port 79 is preferably controlled by a suitable check valve 81. As long as the pressure within chamber 17 is not greatly in excess of the fluid pressure existing in port 14, check valve 81 remains closed. However, if it happens that the pressure in chamber 17 is substantially in excess of the pressure in port 14, due for example to a sudden lowering of pressure in port 14, check valve 81 is opened by fluid pressure to permit escapement of fluid pressure from chamber 17. Check valve 81 can also serve to prevent the building up of an undue lubricant pressure in chamber 17, in the event that too great a supply of lubricant is supplied to this chamber from the lubricating system for the valve.

The modification illustrated in Figs. 8 and 9, differs from the forms previously described in that the gearing is connected to the small rather than the large end of the plug. In this case the chamber 83 at the small end of the plug, corresponds to the chamber 16 in Fig. 1, while chamber 84 at the large end of the plug corresponds to chamber 17 of Fig. 1. Cover plate 86, which is resilient, corresponds to cover plate 18 of Fig. 1, while chamber 83 at the small end of the plug is defined in part by another cover plate 87. The segmental worm gear ring 88 has a driving connection with the small end of the plug and engages with worm gear 89 fixed to the rotatable operating shaft 91. Operating shaft 91 differs from the corresponding shaft 26 of Fig. 3, in that it has provision for the axial introduction of lubricant. Thus this shaft is provided with an axial bore 92, having its inner end communicating with a duct 93 which leads into the chamber 83. Pressure screw 94 is threaded into bore 92, and a check valve 96 is also provided to prevent back flow of lubricant.

At the large end of the plug there is a diaphragm 98 extending across the inner face of cover plate 86, and interposed between thrust bearing 23 and thrust block 69. Screw 99, threaded into the center of cover plate 86, has its inner end engaging thrust block 69, and enables adjustment of the force with which the plug is held into the seat. The plug in this instance is also shown as provided with a bore 101 communicating with the hole in the plug and with the chamber 84 at the large end of the plug. Flow of fluid through this port is controlled by check valve 102, the operation of which is similar to check valve 81 of Fig. 6.

It will be noted that in Fig. 8 there is no small channel corresponding to the channel 63 of Fig. 1, connecting the chamber 84 at the large end of the plug with the lubricant channels in the valve working surfaces. However, when the plug of the valve illustrated in Fig. 8 is jacked by introduction of lubricant under pressure into chamber 83, a certain amount of lubricant extrudes from the channels in the valve working surfaces, and a certain amount of this extruded lubricant finds its way into chamber 84. Thus lubricant in this chamber is replenished from time to time, as the valve is operated.

I claim:

1. In a valve of the plug type, a casing having a passageway therethrough and a seat or bore formed transversely of the passageway, a valve plug rotatably disposed within said bore, the casing being so formed as to provide closed chambers at both ends of the plug, one of said chambers being closed by a resilient cover serving to yieldingly hold the plug in its seat, means for supplying lubricant under pressure to the other of said chambers to effect longitudinal movement of said plug relative to the casing, and also to effect lubrication of the valve working surfaces, a rotatable operating member extending into the other of said chambers and sealed with respect to the casing, and reducing gearing disposed within one of said chambers and serving to operatively connect the operating member with said plug.

2. In a valve of the plug type, a casing having a passageway therethrough and a tapered seat formed transversely of the passageway, a tapered valve plug disposed within said seat, the casing being closed at both ends of the plug and forming a lubricant chamber at the small end of the plug, a resilient cover closing the large end of the seat and yieldingly holding the plug in its seat means for introducing lubricant under pressure into said chamber to effect jacking of the plug from its seat, a rotatable operating member extending into the casing and sealed with respect to the same, and reducing gearing disposed within the casing and serving to operatively connect the operating member with said plug.

3. In a valve of the plug type, a casing having a passageway therethrough and a tapered seat formed transversely of the passageway, a tapered valve plug rotatably disposed within said seat, a pressure lubricating system for said valve serving to supply lubricant to the valve working surfaces, said system including lubricant chambers formed in the casing at the ends of the plug together with means for attenuating the lubricating pressure introduced into the chamber at the large end of the plug, whereby the plug can be hydraulically jacked from its seat, a rotatable operating member extending into the casing and sealed with respect to the same, and reducing gearing disposed within one of said chambers and operatively connecting the operating member with the plug.

4. In a valve of the plug type, a casing having a passageway therethrough and a tapered seat formed transversely of the passageway, a tapered valve plug rotatably disposed within said seat, a pressure lubricating system for said valve, said system including lubricant chambers formed within the casing at the ends of the plug and lubricant channels in the valve working surfaces, said system also including means for attenuating the pressure of lubricant supplied to the chamber at the large end of the plug whereby the plug can be hydraulically jacked from its seat by lubricant pressure in the other chamber, a rotatable operating member extending into the casing and sealed with respect to the same, and reducing gearing disposed within the chamber at the large end of the plug and serving to operatively connect the operating member with said plug.

5. In a valve of the plug type, a casing having a passageway therethrough and a tapered seat formed transversely of the passageway, a tapered valve plug rotatably disposed within said seat, a pressure lubricating system for said valve, said system including lubricant chambers formed at both ends of the plug and lubricant channels in the valve working surfaces, said lubricating system including means for attenuating the pressure of lubricant supplied to the chamber at the large end of the plug, whereby the plug can be hydraulically jacked from its seat by lubricant pressure in the other chamber, a rotatable operating member extending into the casing and sealed with respect to the same, and reducing gearing disposed within the chamber at the small end of the plug and serving to operatively connect the operating member with said plug.

6. In a valve of the plug type, a casing having a passageway therethrough and a tapered seat formed transversely of the passageway, a tapered plug valve rotatably disposed within said seat, the casing being formed to provide closed chambers at both ends of the plug, the chamber at the large end of the plug being defined in part by a resilient cover portion extending across the large end of the seat and sealed with respect to the remainder of the casing, means for supplying lubricant under pressure to the other of said chambers to effect longitudinal movement of said plug relative to said casing, a thrust bearing acting between said cover portion and the large end of the plug and serving to yieldingly urge the plug into its seat, a rotatable operating member extending into the casing and sealed with respect to the same, and reducing gearing disposed within one of said chambers and serving to operatively connect the operating member with said plug.

7. In a valve of the plug type, a casing having a passageway therethrough and a tapered seat formed transversely of the passageway, a tapered valve plug rotatably disposed within said seat, the casing being formed to provide closed chambers at both ends of the plug, the chamber at the large end of the plug being defined in part by a resilient cover portion extending across the large end of the bore and sealed with respect to the remainder of the casing, a thrust bearing acting between the central part of said cover portion and the large end of the plug, whereby the plug is yieldingly urged into its seat, a rotatable operating member extending into the casing and sealed with respect to the same, a reducing gearing disposed within the casing and serving to operatively connect the operating member with said plug, and a pressure lubricating system for said valve, said system including chambers formed in the casing at both ends of the plug and lubricant channels interrupting the valve working surfaces, communicating between the chamber at the large end of the plug and the remainder of the system being restricted to enable jacking of the plug from its seat, said thrust bearing and said gearing being disposed in at least one of said chambers.

8. In a valve of the plug type, a casing having a passageway therethrough and a tapered seat formed transversely of the passageway, a tapered plug rotatably disposed within said seat, said casing including a yieldable cover portion or plate extending across the one end of the seat and having its peripheral portion sealed with respect to the main portion of the casing said cover serving to yieldingly hold the plug in its seat, there being a closed chamber formed in the casing between the said one end of the plug and said cover plate, a rotatable operating shaft sealed with respect to the casing and extending into said chamber, said shaft extending through the main portion of the casing as distinguished from the cover plate, gearing connecting the inner portion of the operating shaft with said plug, a chamber formed in the casing adjacent the other end of a plug and means to supply lubricant under pressure thereto to effect longitudinal movement of the plug relative to the casing.

9. In a valve of the plug type, a casing having a passageway therethrough and a plug seat formed transversely of the passageway, a valve plug rotatably disposed within said seat, a resilient cover for said casing to yieldably hold the plug in its seat, means for introducing lubricant under pressure under the small end of the plug for jacking it from its seat, means for conducting lubricant above the large end of the plug at a substantial loss in pressure, a rotatable member eccentrically disposed with relation to said plug, and gearing to operatively connect the operating member and the plug for turning the latter.

10. In a plug valve, a casing having a passageway therethrough and a seat formed transversely of the passageway, a valve plug rotatably disposed within said bore, there being a lubricant chamber formed between the casing and plug, the seating surfaces of the plug and casing having lubricant grooves connected with said lubricant chamber, said casing being provided with a gear chamber, a rotatable operating member extending into the gear chamber, reduction gearing disposed in said gear chamber for operatively connecting the operating member with said plug for rotating the same, a cover for enclosing said gearing, means for sealing around said operating member, means for supplying lubricant under pressure to said lubricant chamber and grooves, and means to conduct lubricant from said grooves to said gear chamber.

11. In a valve of the plug type, a casing having a passageway therethrough and a seat formed transversely of the passageway, a valve plug rotatably disposed within said seat, a pressure lubricating system for said valve, said system including lubricant chambers formed at both ends of the plug and lubricant channels in the valve working surfaces, said lubricating system including means for attenuating the pressure of lubricant supplied to the chamber at one end of the plug, whereby the plug can be hydraulically jacked by lubricant pressure in the other chamber, a rotatable operating member extending into the casing and sealed with respect to the same, and reducing gearing disposed within a chamber at an end of the plug and serving to operatively connect the operating member with said plug.

SVEN JOHAN NORDSTROM.